United States Patent [19]

Olliff

[11] Patent Number: 4,766,799

[45] Date of Patent: Aug. 30, 1988

[54] METHOD OF AND APPARATUS FOR FABRICATING A TOOL TO FORM AN ASYMMETRICAL CONSTANT CROSS SECTION BORE IN THE PROPELLANT IN A SOLID ROCKET MOTOR

[75] Inventor: Martin T. Olliff, Huntsville, Ala.

[73] Assignee: Morton Thiokol, Inc., Chicago, Ill.

[21] Appl. No.: 87,539

[22] Filed: Aug. 20, 1987

Related U.S. Application Data

[62] Division of Ser. No. 851,186, Apr. 14, 1986.

[51] Int. Cl.⁴ ............................................. F42B 33/00
[52] U.S. Cl. ........................................ 86/45; 264/3.3; 264/3.5; 102/287
[58] Field of Search ................................ 264/3.1–3.6; 102/289, 291, 292, 283; 86/45

[56] References Cited

U.S. PATENT DOCUMENTS

| | | | |
|---|---|---|---|
| 3,663,148 | 5/1972 | Walker et al. | 264/3.1 X |
| 3,673,287 | 6/1972 | Thies et al. | 264/3.1 |
| 3,946,557 | 3/1976 | Macbeth | 60/253 |
| 3,983,780 | 10/1972 | Roach et al. | 264/3.1 X |
| 4,374,073 | 2/1983 | Hall, Jr. et al. | 264/3.1 |
| 4,420,440 | 12/1983 | Marz | 264/3.3 |
| 4,469,647 | 9/1984 | Speer | 264/3.1 |
| 4,654,097 | 3/1987 | Sauyage | 102/289 X |
| 4,705,655 | 11/1987 | Maures et al. | 264/3.4 |

Primary Examiner—Peter A. Nelson
Attorney, Agent, or Firm—Gerald K. White

[57] ABSTRACT

An elongated flexible bag is fitted inside templates that have aligned openings therein corresponding in shape to that desired for a solid rocket motor propellant bore. With the bottom sealed, the bag is filled with a multiplicity of solid pieces each having a cross section substantially less than that of the bag. When filled, suction is applied to the bag by a vacuum needle to exhaust air therefrom until the bag is very tight on the solid pieces contained therein. The vacuum needle is then withdrawn, the hole made thereby is sealed, and the templates are removed from the bag. After use in loading a solid rocket motor with propellant, the bag is cut open, the solid pieces are removed, and the bag is peeled out of the bore in the propellant.

10 Claims, 3 Drawing Sheets

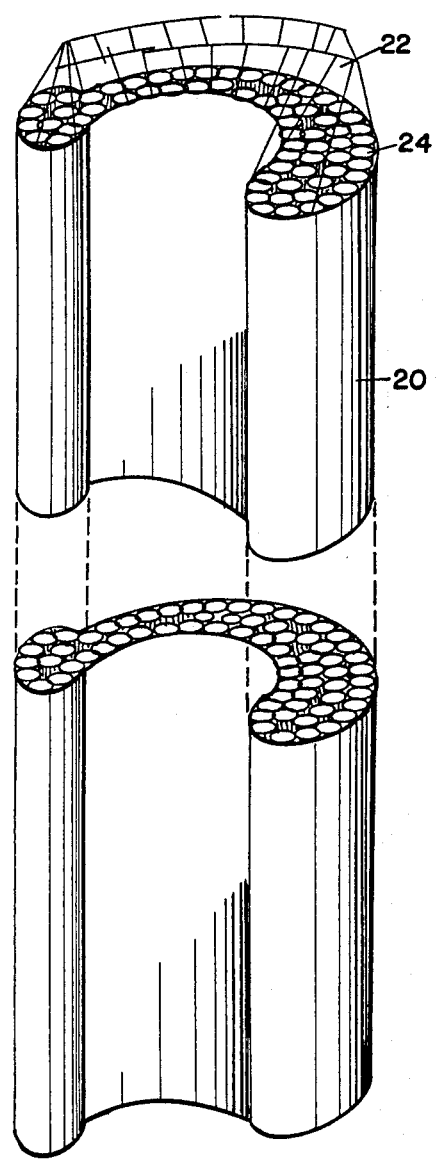
Fig. 3
   
Fig. 4   Fig. 5

METHOD OF AND APPARATUS FOR FABRICATING A TOOL TO FORM AN ASYMMETRICAL CONSTANT CROSS SECTION BORE IN THE PROPELLANT IN A SOLID ROCKET MOTOR

This is a divisional of co-pending application Ser. No. 851,186 filed on Apr. 14, 1986 pending.

BACKGROUND OF THE INVENTION

1. Field of the Invention

The present invention relates to a tool and a method for the fabrication thereof for forming bores of unusual or asymmetrical cross section in the propellant in solid rocket motors.

2. Description of the Prior Art

Solid propellant rocket motors utilize a thin-wall cylindrical rocket motor case that is closed at the forward end and has a nozzle at the other end for the emission of exhaust gases from the case. A case-bonded solid propellant may be cast into the rocket motor case after a core of fixed and desired configuration, generally made of metal, has been placed in the case with the propellant filling the space between the core and the case, after which the propellant grain is cured. The core is then removed leaving a cavity or bore having a constant or unchanging cross section the shape of which corresponds to the constant cross section of the core, thus duplicating the exterior contour of the core.

The core may possess a plurality of star points that are arranged symmetrically with relation to the longitudinal axis of the core, the number of star points varying according to the individual requirement of the particular solid propellant rocket motor that is involved.

Solid propellant rocket motor cores may also possess unusual or asymmetric geometries such as, but not limited to, a "hook" as disclosed, for example, in U.S. Pat. No. 3,529,550 to Ralph W. Snowden, issued on Sept. 22, 1970 and assigned to the assignee of the present invention. Such cores enable many variations in the characteristics of the solid propellant grain such as are needed to meet specific requirements of a solid propellant rocket motor and such as occur when the number of star points of a symmetrical core is varied. Cores of such unusual configuration have advantages including high loading density and reduction of strains in the solid propellant grain that are encountered by the solid propellant rocket motor under temperature changes that occur during its operational requirements.

The fabrication, however, of metal cores in accordance with the practice of the prior art to form unusual or asymmetrical constant cross section bores for use in solid rocket motors requires complex, and hence, expensive machining. The "hook" configuration is complicated and, in general, can be made only with the use of three-dimensional numerical control (NC) controlled machining capability.

Thus, there is a need and a demand for improvement in the tools and the method of the fabrication thereof for forming such tools quickly with little requirement for special machining capability. The present invention was devised to fill the technological gap that has existed in the art in this respect.

SUMMARY OF THE INVENTION

An object of the invention as to provide an improved method of and apparatus for fabricating a tool or core to form an asymmetrical, constant cross section bore in the propellant in a solid rocket motor.

In accomplishing this and other objectives of the invention, an elongated flexible bag is fitted inside templates that have aligned openings therein that are shaped to correspond to the cross section desired for the bore in the propellant of a solid propellant rocket motor. With one end sealed, the bottom end, the bag is filled with a multiplicity of individual solid pieces of matter each of which is substantially smaller in cross section than that of the bag. As a result, when filled with such pieces, the bag is made to conform in cross sectional shape to that of the shaped openings in the templates.

In one embodiment the individual pieces may comprise small rods of round cross section. In another embodiment the individual members may comprise small rods of hexagonal cross section. In still another embodiment, the individual members may comprise particles of granular material such as sand.

When the bag has been filled with the multiplicity of pieces, the top end of the bag is sealed and air is exhausted or pulled from the bag by means of a vacuum needle until the bag is very hard on the bundle of rods or mass of granular material therein. The vacuum needle is then withdrawn, the hole made in the bag by the needle is sealed, and the templates are removed from the bag.

The resulting rigid structure is then ready for use as a tool or core for loading a solid rocket motor with propellant. After such loading and curing of the propellant, which loading may be effected in a manner known in the prior art as described hereinbefore, the bag may be cut open, the rods or other material contained in the bag may be extracted, and the plastic of which the bag is made may be peeled out of the bore in the propellant.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this description of the invention, a detailed description follows with reference being made to the accompanying drawings which form part of the specification and in which like parts are designated by the same reference numerals, of which drawings:

FIG. 3 is a fragmented perspective view of the completed tool according to the invention;

FIGS. 4 and 5 are views showing alternative cross sections that may be used for the rods employed in the embodiment of FIGS. 2 and 3 in the practice of the invention.

DESCRIPTION OF THE PREFERRED EMBODIMENT

Figure 1:
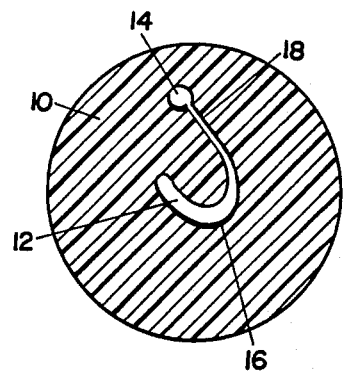
FIG. 1 is a transverse sectional view of the propellant in a solid rocket motor illustrating the configuration of a typical asymmetrical constant cross section bore therein, specifically a hook-shaped bore.

Referring to the drawings, the numeral 10 in FIG. 1 designates a solid propellant grain of a rocket motor in which an asymmetrical, constant cross section bore or cavity 12 having a hook shape is formed. The bore 12, as shown, includes a bulbous end 14, a curved hook formation 16 and a shank 18 that joins the end 14 and the curved hook formation 16 into a unitary configuration having a hook shape.

Figure 2:
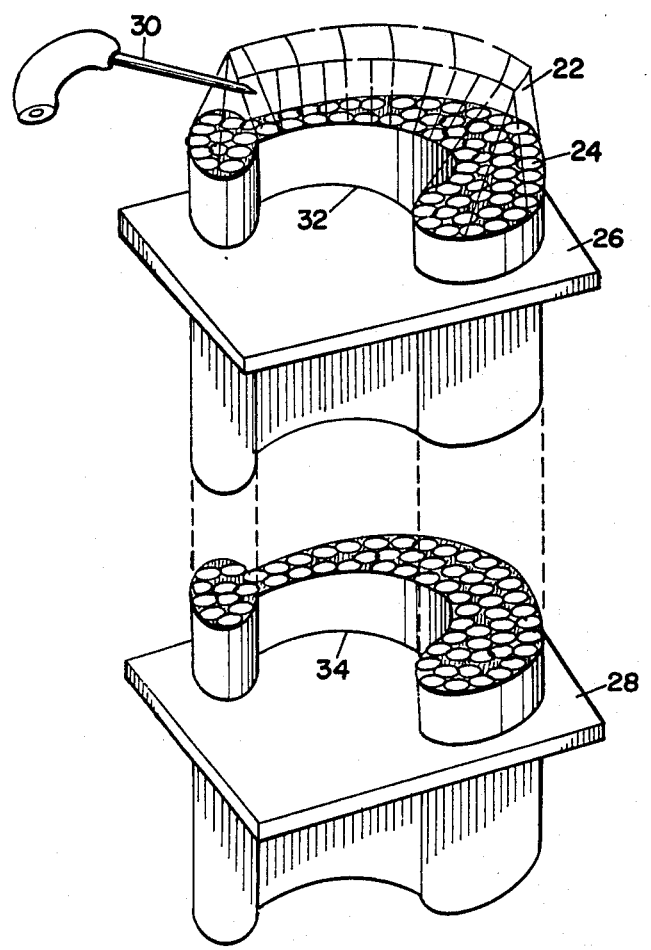
FIG. 2 is a fragmentary perspective view of a tool, at an intermediate stage in the fabrication thereof, that is made in accordance with the invention and in which a multiplicity of individual pieces employed in the fabrication thereof comprise small rods.

A tool 20 according to the invention that may advantageously be employed in the formation of the hook-shaped bore 12 in the propellant 10 of FIG. 1 is shown in FIG. 3. The tool 20 comprises an elongated plastic bag 22 of suitable size which may be made of Teflon or other suitable material. Bag 22 is filled with a multiplicity of small elongated rods 24 that may be made of any suitable solid material such as wood, plastic, metal, etc., and that may have a round or hexagonal cross section, as shown in FIGS. 4 and 5, respectively. Rods 24 may have a length corresponding substantially to that of bag 22. After being filled with rods 24 while held constrained in suitably shaped openings in templates 26 and 28 as shown in FIG. 2, bag 22 is sealed and the air therein is exhausted by means of a vacuum needle 30 to which suction at a suitable vacuum pressure is applied from a source (not shown). Such suction is applied by means of needle 30 until the bag 22 is very tight on the bundle of rods 24, thus forming a hard, rigid structure.

Templates 26 and 28 may be made of any suitably stiff material such, for example, as cardboard, Masonite, sheet metal, etc. The respective openings 32 and 34 provided in templates 26 and 28 may be formed therein by hand or in any other suitable manner. The shapes of the openings 32 and 34 correspond to the asymmetrical or hook shape desired for the bore 12 to be produced in the propellant 10.

The several steps in the method of fabricating the tool 20 and the subsequent use thereof, according to the present invention, comprise the following:

1. Using a suitably-sized plastic bag 22 with the bottom end thereof sealed, the bag 22 is fitted inside the shaped openings 32 and 34 in templates 26 and 28, respectively, with the templates being suitably retained in spaced relationship along the length of the bag 22.

2. The inside of the bag 22 is filled with the rods 24.

3. The top of the bag 22 is sealed by heat sealing or other suitable means.

4. Using vacuum needle 30 connected to a suitable suction source, the air is exhausted from the bag 22 until the bag 22 is very tight on the bundle of rods 24.

5. The vacuum needle 30 is withdrawn from the bag 22 and the hole in bag 22 made by the needle 30 is sealed by heat seal or other suitable means.

6. The templates 26 and 28 are removed from bag 22 and the contained bundle of rods 24 whereby there is produced a tool or core 20, as shown in FIG. 3, that is very rigid and hard.

7. The tool or core 20 may be used to load a rocket motor with propellant in accordance with known solid rocket motor propellant loading procedures of the prior art as described hereinbefore.

8. Cut the bag 22 open, extract the rods 24, and peel out the plastic of which the bag 22 was formed from the bore in the propellant.

As those skilled in the art will understand, while two templates 26 and 28 only are shown in FIG. 2, more than two such templates may be employed if such should be found to be necessary or desirable for facilitating the fabrication of the tool or core 20.

Figure 6:
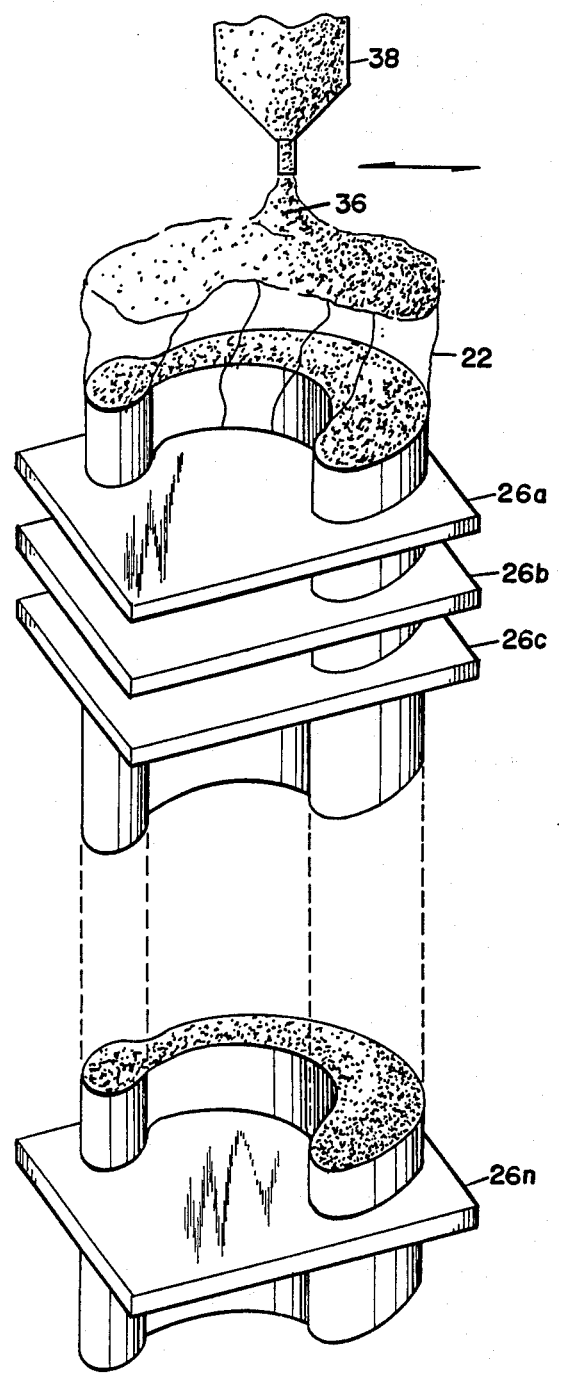
FIG. 6 is a fragmentary sectional view of a tool, at an intermediate stage in the fabrication thereof, according to another embodiment of the invention, in which the multiplicity of individual pieces employed comprise grains of sand.

Alternatively to the use of a multiplicity of rods 24 in the fabrication of the tool or core 20, a granular material such as sand indicated at 36 in FIG. 6, may be employed for filling the bag 22. As shown in FIG. 6, sand 36 may be dispensed into the top opening of bag 22 from a reciprocating funnel 38 to which sand is supplied from a source not shown. Even with the use of granular material 36, the tool or core 20 that results upon exhaustion of the air from bag 22 is very rigid and hard. With the use of such granular material for filling bag 22, however, the employment of additional templates, as indicated by the templates 26a, 26b, 26c. . . 26n, to ensure the uniformity or constancy of the cross section of the tool or core 20, is desirable. If necessary, a single template having a length corresponding substantially to that of the bag may be employed.

It is contemplated that all of the templates 26, 28, 26a, 26b, etc. may be removed from the bag 22 and the bundle of rods 24 or other material contained therein by sliding them off the ends of the stiffened and rigid bag structure resulting from the exhaustion of air therefrom. Alternatively, the templates 26, 28, 26a, 26b, etc. may be removed by cutting them away.

Thus, in accordance with the invention, there has been provided a method of and apparatus for fabricating a tool or core to form an asymmetrical constant cross section cavity or bore in the propellant, in a solid rocket motor. This improved method is characterized in that it enables the fabrication of such a tool quickly and with little special machining capability, as contrasted with the prior art requirement for three-dimensional NC controlled machining capability. The present invention simplifies the construction of tools that are very difficult to build using the methods of the prior art. The invention also allows greater flexibility.

With this description of the invention in detail, those skilled in the art will appreciate that modifications may be made to the invention without departing from its spirit. Therefore, it is not intended that the scope of the invention be limited to the specific embodiment illustrated and described. Rather, it is intended that the scope of the invention be determined by the appended claims and their equivalents.

What is claimed is:

1. Apparatus for fabricating a tool for forming a bore of desired cross sectional form in the propellant of a rocket motor comprising, template means providing a shaped opening corresponding to the cross sectional form desired for the propellant bore, a multiplicity of individual solid pieces of matter, and a bag of flexible material fitted inside the opening provided by said template means and filled with said individual solid pieces of matter, said bag when filled being sealed and exhausted of air until tight on the multiplicity of pieces of matter therein and thereby formed into a rigid structure, whereby said template means may be removed and said rigid structure may be used in the loading of a rocket motor propellant to form a bore therein.

2. Apparatus as defined by claim 1 wherein said bag is made of plastic.

3. Apparatus as defined by claim 1 wherein the opening provided by said template means is asymmetrical in form whereby said tool may be made to form an asymmetrical constant cross section bore in the rocket motor propellant.

4. Apparatus as defined by claim 1 wherein said template means comprises a plurality of spaced individual templates each having a shaped opening corresponding to the cross section form desired for the propellant bore, the openings of all of said templates being positioned in alignment.

5. Apparatus as defined by claim 4 wherein said multiplicity of solid pieces of matter comprise small rods each of which have a length corresponding substantially to that of said bag.

6. Apparatus as defined by claim 5 wherein said rods have a round cross section.

7. Apparatus as defined by claim 5 wherein said rods have a hexagonal cross section.

8. Apparatus as defined by claim 4 wherein said multiplicity of solid pieces of matter comprise grains of sand.

9. Apparatus as defined by claim 1 wherein said multiplicity of solid pieces of matter comprise rods.

10. Apparatus as defined by claim 1 wherein said multiplicity of solid pieces of matter comprise grains of sand.

* * * * *